Figure 1:
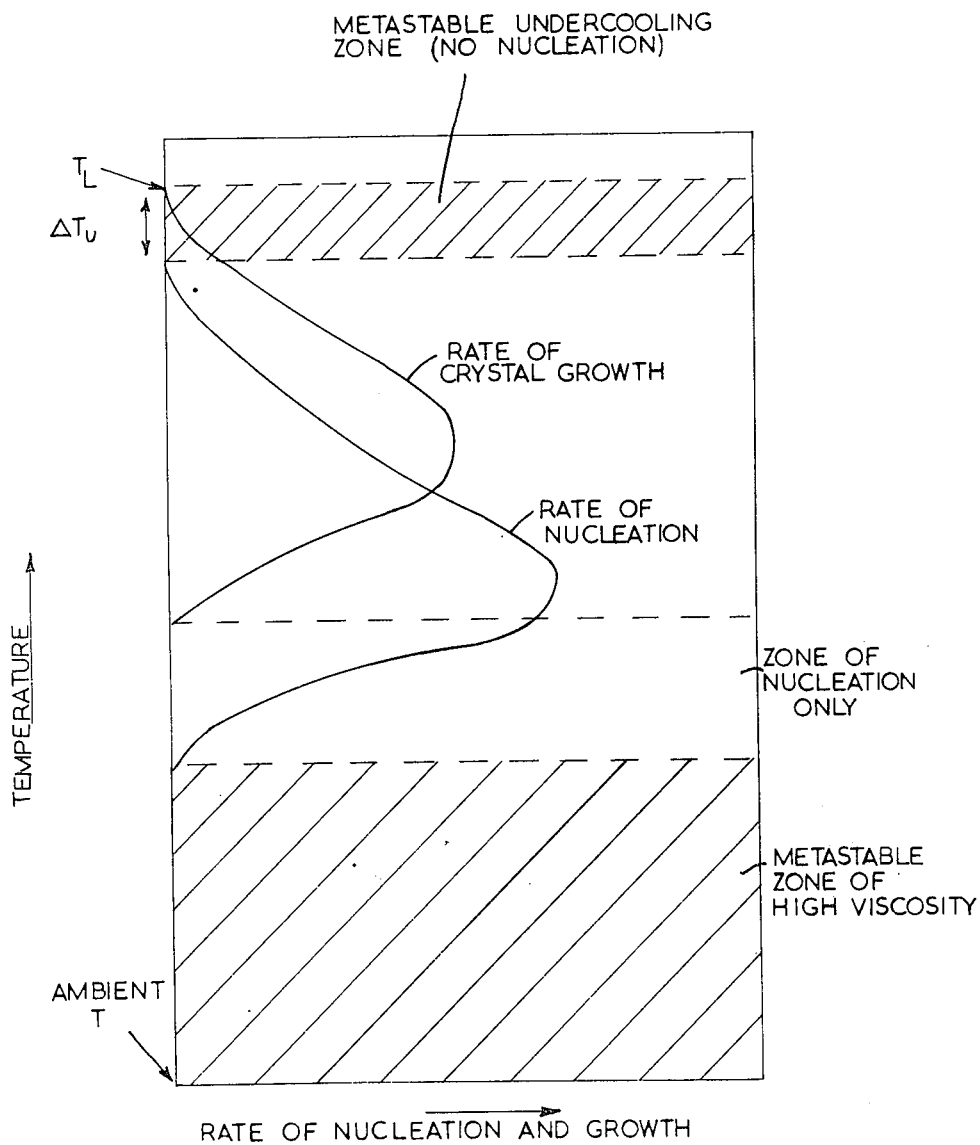

United States Patent [19]
Clark-Monks

[11] 3,929,497
[45] Dec. 30, 1975

[54] CRYSTALLIZABLE GLASS SUITABLE FOR FIBER PRODUCTION

[75] Inventor: Colin Clark-Monks, Sheffield, England

[73] Assignee: Fiberglas Canada Ltd., Toronto, Canada

[22] Filed: Jan. 31, 1973

[21] Appl. No.: 328,467

[52] U.S. Cl. .......... 106/50; 106/39.8; 65/2; 65/33; 65/134
[51] Int. Cl.² ......... C03C 13/00; C03C 3/22; C03B 37/00; C03B 32/00
[58] Field of Search ....... 65/33, 134, 2; 106/39 DV, 106/39.8, 50

[56] References Cited
UNITED STATES PATENTS

| | | | |
|---|---|---|---|
| 3,013,888 | 12/1961 | De Lajarte | 106/39 DV |
| 3,193,503 | 6/1965 | Smith | 106/39 DV |
| 3,218,262 | 11/1965 | De Lajarte | 65/33 X |
| 3,464,836 | 9/1969 | Pendleton et al. | 106/39 DV |
| 3,523,803 | 8/1970 | Haslay et al. | 65/2 X |
| 3,557,575 | 11/1971 | Beal | 65/33 |
| 3,597,180 | 8/1971 | Erickson | 65/33 |
| 3,679,443 | 7/1972 | Mechel et al. | 65/2 X |
| 3,854,986 | 12/1974 | Chvalovsky et al. | 65/3 X |

*Primary Examiner*—Leon S. Bashore
*Assistant Examiner*—Frank W. Miga
*Attorney, Agent, or Firm*—Stevens, Davis, Miller & Mosher

[57] ABSTRACT

The manufacture of fibrous insulating products which will devitrify or crystallize when exposed to fire. Such insulating products will withstand relatively high fire temperatures without deformation. The compositions have comprised by weight the following constituents.

| | |
|---|---|
| $SiO_2$ | 45–50% |
| $Al_2O_3$ | 10–15% |
| CaO | 10–15% |
| MgO | 5–15% |
| $Fe_2O_3$ | 5–15% |
| $Na_2O$ | 5–15% |
| $TiO_2$ | 0.5–5% |
| MnO and/or $MnO_2$ | 0–1% |

The disclosure also contains a method of preparing glass-ceramic compositions of high softening point and having the constituents in proportions as recited above, and which after solidification are capable of rapid devitrification when reheated which comprises compounding conventional glass making raw materials in proportions suitable for yielding the foregoing glass compositions and melting said mixture of raw materials in a neutral or oxidizing environment to obtain a homogeneous glass mass. The melting will preferably be effected in an oxidizing atmosphere at temperatures in the range of 1200° to 1500°C.

14 Claims, 2 Drawing Figures

THE CRYSTALLISATION OF VISCOUS LIQUIDS

CRYSTALLIZABLE GLASS SUITABLE FOR FIBER PRODUCTION

This invention relates generally to glass compositions; and more particularly, to crystallizable glass compositions which can be readily formed into fibers having high temperature resistance, and to a process for preparing such compositions and fibers.

Glass fibers have many valuable properties, e.g., they are incombustible, nonabsorbent, nonhygroscopic, chemically stable, have very high tensile strength, and possess excellent thermal, electrical and sound insulating properties. Because of these properties, glass fibers are extensively used for numerous applications. Such fibers can be readily and inexpensively made according to several well known processes. Among such processes may be mentioned those described in U.S. Pat. No. 2,287,007 of Kleist et al issued June 16, 1942; U.S. Pat. 2,300,736 of Slayter et al issued Nov. 3, 1942; Canadian Pat. 412,754 of Staelin issued May 25, 1943 and U.S. Pat. 3,560,179 of Kleist issued Feb. 2, 1971. However, glass fibers formed from conventional glass compositions and made by known processes have a drawback which tends to limit their use in certain applications; when subjected to elevated temperatures, e.g., in excess of about 1100°F, the fibers and products made therefrom undergo significant changes in dimensions and shape. Thus insulating wool and mat compositions made from such fibers, lose their shape when subjected to temperatures such as are commonly encountered in fires and in turn, the insulating properties of such products are greatly diminished or may even be lost altogether.

Those familiar with glass fibre technology will recognize that the choice of glasses of relatively low softening temperture and of specified viscosity characteristics is dictated by the materials and configuration of the manufacturing devices, especially by the temperatures at which the fiberizing apparatus of the above mentioned processes can operate, safely and economically.

It would thus be desirable to produce a glass from conventional glass making raw materials which can be readily melted and readily fiberized by presently known methods of manufacture and yielding fiber, and fiber products which will retain integrity of dimension and shape when heated to temperatures substantially higher than 600°C, due to their inherent or imparted properties. Such a glass composition would usefully provide a basis for high temperature thermal and acoustical insulating materials, e.g., fire-rated acoustical ceiling board.

More specifically, such a glass composition will have to exhibit chemical and rheological properties compatible with materials and temperature limitations of sophisticated fiberizing devices. Also such a glass composition will have to yield fibers and fibrous insulating products exhibiting chemical and physical properties equal or superior to those currently available.

It is known that certain glass compositions will, upon cooling, retain their glassy properties, but will, when carefully reheated in a predetermined manner, crystallize (devitrify) to materials which have significantly higher softening points than the original glass composition. Such compositions are known as glass-ceramics. Products of this type are composed of a very large number of fine-grained crystals of relatively uniform size randomly oriented and uniformly dispersed in a glassy matrix, the crystals comprising the major portion of the body. Such products are made by the controlled crystallization of glass bodies, e.g., in the manner described in U.S. Patent 2,920,971 of S. D. Stookey.

One approach to the problem of formulating a crystallizable glass, suitable for use in fiber form, which has been taken is the investigation into the processability and crystallization of glasses which are similar in composition to naturally occuring basaltic rocks. Naturally occuring basaltic rocks form the basis of a highly successful glass-ceramic products industry in the U.S.S.R. In the processes used therein, such rocks are melted under reducing conditions and formed (shaped) in the glassy state. Upon reheating, the shaped glass articles micro-crystallize, with the number of crystals depending upon the availability of metal sulphides as centers of nucleation.

The processes employed in the U.S.S.R. therefore depend on highly reducing conditions during the manufacturing process to produce metal sulphides to act as nuclei for crystals to develop in the product. Moreover, under such conditions a substantial portion of iron is in the ferrous state. Iron sulphides and/or ferrous iron compounds are incompatible with the refractory furnace materials and especially with the metals used in apparatus for fiberizing the molten glass.

Beall in U.S. Pat. No. 3,557,575 issued Jan. 26, 1971 describes a process for making glass-ceramic articles from basalt. In this process a specific type of basaltic rock containing iron oxides is used as the raw material for glass-ceramics. Beall's process is carried out under oxidizing conditions and the nucleation and subsequent crystallization are based upon magnetite ($Fe_3O_4$) with or without clinopyroxene.

The process and the underlying glass compositions yield very satisfactory glass-ceramic products for certain applications, i.e., articles which are hard, abrasion resistant, resistant to thermal shock, and to the action of chemicals. However, reference to operating temperatures, time-temperature schedules required to introduce crystallization in these glasses will serve to distinguish those of Beall from those considered by us essential for producing fibers by the specified fiberizing processes and for their rapid conversion into glass-ceramic fibers under the conditions of use.

In all cases, where glass-ceramic objects others than fibers are manufactured, they are formed in the glassy state and the whole mass subsequently devitrified, with internal nucleation preferred over devitrification of the surface.

In the fibrous insulating products industry, certain slagwool or rockwool compositions are known to form glassy wool fibers which either upon cooling or upon exposure to heat will crystallize to fibres of higher softening characteristics.

The ability to recrystallize, in this case too, is contingent on the reducing conditions existing in the cupola melters used by that industry, and the resulting nucleation by metal sulphides, and is absent when the same compositions are processed under the oxidizing conditions of glass melting furnaces. Moreover, such compositions must be melted and fiberized at temperatures higher than are compatible with fiberizing apparatus for glass, in keeping with the above cited modern processes.

Consequently, the use of such slag or rock wool compositions is restricted to use with fiberizing equipment offering limited control over fiber diameter and other product properties.

The crystallization of glassy materials has been the subject of intensive research for many years and the theoretical background is now highly developed. A simple qualitative picture of the general concepts is presented herein. For more detailed information, the reader is referred to the following publications:

1. B. Locsei, "Molten Silicates and Their Properties" Akademiai Kiado, Budapest (1970).
2. P. W. McMillan, "Glass-Ceramics", Academic Press, London (1964).
3. R. J. Charles, Phys. Chem. Glass 10 169 (1969), idem 8 185 (1967).
4. P. S. Rogers and J. Williamson, Glass Tech. 10 128 (1969).
5. D. Turnbull and M. H. Cohen, p. 38–62 in "Modern Aspects of the Vitreous State", Vol. 1, ed. J. D. MacKenzie, Butterworths (1960).
6. P. S. Rogers, Mineralog, Mag. 37 741 (1970).
7. J. F. MacDowell, Ind. and Eng. Chem. 58 39 (1966).

Crystal growth can proceed only when crystal nuclei are present. Nuclei may be formed homogeneously (where the nucleus is the same as the subsequent crystal) or heterogeneously, and it is commonly believed that in practice only heterogeneous nucleation is observed in silicate glasses. In the crystallization of viscous liquids, the metastable undercooling zone $\Delta T_u$ has been associated with phase separation or material precipitation, and the temperature range is often practially too small to be well defined. For the commercial controlled production of glass fiber, it is desirable to have $\Delta T_u$ as large as possible with $(T_L - \Delta T_u)$ lying below the temperatures associated with fiber formation. [$(T_L - \Delta T_u)$ is an effective liquidus temperature when considering cooling from above that temperature.] Furthermore, it is desirable to have a bulk recrystallization since the presence of any significant amount of glassy phase could lead to deformation of the crystallized fiber at elevated temperatures.

Basaltic type ceramics are prepared by heterogeneous nucleation normally achieved by the precipitation of FeS and MnS within the glassy phase and subsequent bulk crystal growth of a material which has been called "Synthetic Stone", said material being close in composition to the original glass. Such preparation requires that the glassy basalt be melted under strongly reducing conditions. Recent research has demonstrated that in the $CaO-MgO-Al_2O_3-SiO_2$ system, only glasses containing ferric oxide showed any tendency to internal nucleation and bulk crystallization; nucleation was found to occur by the formation of $MgAl_2O_4$ spinel (formation appears to be considerably enhanced by the presence of $Fe_2O_3$, probably by associated complex iron containing spinel precipitate).

Since basaltic type glass-ceramics yield desirable thermo-mechanical properties while at the same time being readily meltable from relatively cheap commerical glass batch materials, I have investigated the processability and crystallization of glasses which are similar in composition to naturally occuring basaltic rocks, with a view to establishing a highly crystallizable glass composition suitable for fiber production. I have surmised that the crystallographic parameters of spinel should allow effective nucleation of the spinel nucleus by the preliminary precipitation of a titanate, and this would allow enhanced control of $\Delta T_u$ with an expected increase in nucleation rate. More specifically therefore, I have investigated the preparation of glass-ceramic materials of this type within the limits necessary to ensure successful application of presently employed commercial fiber-forming processes, utilizing ($Fe_2O_3$ + $TiO_2$) to control the crystallizability of the materials.

As a result of my investigation, glasses have been prepared under neutral and slightly oxidizing conditions, which are suitable for fiberization and crystallize on heating to yield a material which will withstand temperatures up to about 1100°C or approx 2000°F.

GLASS FORMULATION AND PREPARATION (i) COMPOSITION

According to Voldan, Silikattechnik, 7; 48 (1956) processable basaltic rocks have a composition which falls within the ranges:

|  | Wt. % |
| --- | --- |
| $SiO_2$ | 43.5 – 47.0 |
| $Al_2O_3$ | 11.0 – 13.0 |
| CaO | 10.0 – 12.0 |
| MgO | 8.0 – 11.0 |
| Residue | $P_2O_5$, FeO, $Fe_2O_3$, MnO, $Na_2O$, $K_2O$, $TiO_2$ |

This yields a basic composition in the order of:

|  | Mole % |
| --- | --- |
| $SiO_2$ | 57 |
| $Al_2O_3$ | 9 |
| CaO | 15 |
| MgO | 19 |

Examination of the respective quaternary phase diagrams suggested that if $Fe_2O_3$ could be expected to behave similarly to $Al_2O_3$ in the crystal state, then an increase of ($Al_2O_3$ + $Fe_2O_3$) to around 15 to 20 mole % should result in the primary precipitation of a spinel ($MgAl_2O_4$), with a reasonable melt temperature. The reader is referred to the article by E. M. Levin, C. R. Robbins, and H. F. McMurdie, FIGS. 2647–64 in "Phase Diagrams for Ceramists-1969 Supplement" American Ceramic Society (1969). This assumption has been used as the guideline for the glass formulations of the present invention. In these formulations, $TiO_2$ has been added to enhance primary crystal precipitation and $Na_2O$ included as a fluxing agent (network modifier). The additional elements may act as stabilizers during devitrification. They may also form modifiers whereby the coefficient of thermal expansion of the glass can be varied.

These considerations have led to the present invention, which, in one broad aspect, resides in a readily crystallizable glass-ceramic composition comprising by weight, the following constituents:

| $SiO_2$ | 45 – 50% |
| --- | --- |
| $Al_2O_3$ | 10 – 15% |
| CaO | 10 – 15% |
| MgO | 5 – 15% |
| $Fe_2O_3$ | 5 – 15% |
| $Na_2O$ | 5 – 15% |
| $TiO_2$ | 0.5 – 5% |
| MnO and/or $MnO_2$ | 0  0.5 1% |

In another aspect, the present invention resides in a method of preparing glass-ceramic compositions of high softening point and having the constituents and proportions thereof as recited in the immediately preceding paragraph, and which, after solidification, are capable of rapid devitrification when reheated, which comprises: compounding conventional glass making raw materials in proportions suitable for yielding the foregoing glass compositions and melting said mixture of raw materials in a neutral or oxidizing environment to obtain a homogeneous glass mass.

This invention, in a further aspect, resides in a method of preparing glass fibers of high temperature resistance, comprising the steps of compounding conventional glass making raw materials in proportions suitable for yielding glass compositions comprising by weight:

| | |
|---|---|
| $SiO_2$ | 45 – 50% |
| $Al_2O_3$ | 10 – 15% |
| CaO | 10 – 15% |
| MgO | 5 – 15% |
| $Fe_2O_3$ | 5 – 15% |
| $Na_2O$ | 5 – 15% |
| $TiO_2$ | 0.5 – 5% |
| MnO and/or $MnO_2$ | 0 – 1% | said glass compositions having a high softening point and being capable of rapid devitrification when reheated, melting said mixture of raw materials in a neutral or oxidizing environment to obtain a homogeneous glass mass, converting the homogeneous glass mass into glass fibers or filaments of controlled dimensions and shape and having a high softening point, the said fibers or filaments being capable of rapid devitrification when heated, and collecting said glass fibers or filaments, and in forming glass-ceramic fibers by heating glass fibers prepared as described above, to a temperature above the softening point of the glass, thereby effecting rapid devitrification of the glass fibers.

In yet another preferred aspect the present invention resides in a readily crystallizable glass-ceramic composition, comprising, by weight, the following constituents:

| | |
|---|---|
| $SiO_2$ | 46.0 – 48.4% |
| $Al_2O_3$ | 12.5 – 13.6% |
| CaO | 12.0 – 13.8% |
| MgO | 8.9 – 10.6% |
| $Fe_2O_3$ | 5.0 – 8.0% |
| $Na_2O$ | 6.2 – 7.0% |
| $TiO_2$ | 2.4 – 3.5% |
| MnO and/or $MnO_2$ | 0.3 – 0.6% |

A still more preferred glass-ceramic formulation according to the present invention is one which comprises, by weight:

| | |
|---|---|
| $SiO_2$ | 47.0% |
| $Al_2O_3$ | 13.0% |
| CaO | 12.0% |
| MgO | 10.0% |
| $Na_2O$ | 6.2% |
| $Fe_2O_3$ | 8.0% |
| $TiO_2$ | 3.5% |
| $MnO_2$ | 0.3% |

A number of glass formulation were prepared during the course of my investigation. A preferred formulation is that given in the immediately preceding paragraph and which is below further described as Example 1. However, other glass formulations were designed to investigate the effects of lower contents of $Fe_2O_3$ and $TiO_2$ and of changed CaO/MgO ratios. Such glasses are represented in Examples 2 and 3. Other glass formulations, (not shown here) were designed to examine the reduction in $SiO_2$ + $Al_2O_3$ content, substituting with CaO + MgO.

The $Fe_2O_3$ constituent is relatively expensive, and it may be found that in practice an economic upper limit for the $Fe_2O_3$ content is about 10%.

Glass compositions of Examples 4 to 6 were prepared, evaluated and shown here as examples of compositions outside the useful range in this invention.

(ii) MELTING

Glass batch materials were mixed by conventional techniques, and melted in a refractory crucible in a gas-fired furnace at approximately 1350°C for approximately 4 hours. The furnace atmosphere was maintained to yield generally neutral-slightly oxidizing conditions. This procedure yielded an apparently homogeneous and well-refined glass which was black in color. The glass was cast into rods on a cast-iron mold and air-quenched.

No severe corrosion of the pots was observed.

One batch for glass Example 1 was also prepared with 0.5% of the $Na_2O$ added as sodium nitrate in order to ensure oxidation of the glass. Also, a quantity of the original glass melt of Example 1 was crushed and remelted in a highly oxidizing atmosphere for 4 hours (in a Selas Lab-Rinth furnace) in order to establish proper melting, homogenization, and oxidation.

(iii) FIBERIZATION

Quantities of the experimental glasses were fiberized by means of a one-hole platinum bushing, under operating conditions designed to match those experienced with the non-recrystallizable glasses conventionally used in the manufacture of glass fibers and filaments.

Since the experimental glasses recrystallized rapidly on reheating, it was necessary to remelt the solid glass in the bushing for 1 to 2 hours prior to fiberization.

Glass Evaluation i) Chemical Analysis

Full analyses of the most important glasses were carried out by methods conventional in glass technology laboratories, i.e. classical gravimetric, atomic absorption and/or X-ray fluorescence.

ii) Density

The density of the preferred composition glass was measured by liquid displacement.

iii) Melt Viscosity

Determined by Brookfield viscometer. Reported in terms of the temperature (in °C) at which the glass viscosity equals $10^{2.5}$ poises, (or at which log viscosity = 2.5).

iv) Recrystallization from solid state

As an initial way of screening, the recrystallization behavior was qualitatively examined by heating thin rods and fibrous specimens in a muffle oven at a controlled rate of 15°C per minute, upwards from 550°C. Some fibrous specimens were also examined on a hot-stage microscope, and the thermo-physical characteristics of a thin glass rod of Example 1 were measured by dilatometry.

Glasses of Examples 1, 2, 3 and three other compositions were further examined by differential thermal analysis on 80 milligram samples. Conventional "liquidus temperature" was measured on glasses of Examples 1, 2, 3 and one other.

v) Tolerable Degree of Cooling from Melt

A small quantity of glass (approx. 50 grams) was remelted in a platinum liquidus boat or a refractory crucible at approx. 1300°C in a muffle oven, and the effect of cooling the melt examined. Temperatures were reduced over periods of 30 to 60 minutes and the specimen soaked at the given temperature for 30 to 60 minutes. The sample was then rapidly air - quenched and examined.

The present invention will now be further described with reference to Examples 1–3.

Three glasses were prepared from commercial glass-making raw materials. The raw materials had particle sizes lying within the range U.S. Standard Screen No. 20 to U.S. Standard Screen No. 325; and were mixed for one hour in a jar mill according to the batch formulae shown in Table One.

TABLE No. ONE

| Raw Material | Example 1 | Example 2 | Example 3 |
|---|---|---|---|
|  | (gms) | (gms) | (gms) |
| Silica Sand | 470 | 480 | 290 |
| Dolomite | 400 | 410 | 420 |
| Soda Ash | 107 | 119 | 36 |
| Nepheline Syenite | — | — | 313 |
| Burned Magnesite | 16 | 17 | — |
| Aluminum Hydroxide | 199 | 206 | 92 |
| Rutile | 35 | 35 | 35 |
| Ferric Oxide | 80 | 50 | 76 |
| Manganese Carbonate | 4 | 7 | 7 |

The prepared glass batches were melted in fire-clay pots for 3–4 hours in an oxidizing atmosphere at temperatures in the range 2450°–2500°F (=1340°–1370°C). The glass melts so formed were homogeneous, and were poured onto a cast-iron slab, where they rapidly solidified into homogeneous black glassy masses. The glasses so made were found by calculation and by analysis to have the oxide formulae in weight percent given in Table 2.

TABLE No. TWO

| Oxide | Example 1 | Example 2 | Example 3 |
|---|---|---|---|
| $SiO_2$ | 47.0 | 48.0 | 47.5 |
| $Al_2O_3$ | 13.0 | 13.5 | 13.0 |
| CaO | 12.0 | 12.3 | 12.6 |
| MgO | 10.0 | 10.3 | 8.9 |
| $Na_2O$ | 6.2 | 6.9 | 6.5 |
| $Fe_2O_3$ | 8.0 | 5.0 | 7.5 |
| $TiO_2$ | 3.5 | 3.5 | 3.5 |
| $MnO_2$ | 0.3 | 0.5 | 0.5 |

These glasses were found to have physical properties pertinent to fiberization as shown in Table 3.

TABLE NO. THREE

| (a) | Temperature at a viscosity of 316 poise | 2150–2200°F (1175–1205°C) |
|---|---|---|
| (b) | Conventional Liquidus Temperature | 2200–2240°F (1205–1225°C) |
| (c) | Temperature to which slow cooling from the molten state can occur without recrystallization | 1900–1950°F (1035–1065°C) |

Pieces of these glasses were readily fiberized using a conventional single-hole platinum alloy bushing (See J. A. Burgman - Glass Technology 11 (1970) p. 110–116), when the temperature of the bushing orifice lay between 1900°–2200°F (measured with an optical pyrometer). Prior to fiberizing, it was necessary to completely remelt the glass by raising the bushing temperature above 2450°F (1343°C) for at least 30 minutes. The fibers so made were glassy, flexible, of a golden color to the eye, and had diameters in the range $8 \times 10^{-5}$ to $80 \times 10^{-5}$ inches, (0.00008 to 0.0008 inch).

Small samples of these fibers were heated rapidly to 1900°F (1035°C) from room temperature in an electric muffle furnace, and recrystallized to yield stiff brittle fibers without obvious softening. These observations were later confirmed on a hot-stage microscope.

Large pieces of these glasses (approximately 1½ inch long rods of 1/4 to ½ inch diameter) were similarly heated from room temperature to 1900°F (1035°C) within 45 minutes and also recrystallized without deformation. After heat treatment the rods had changed from a black glass to a greenish-yellow crystalline appearance. Sections through these rods revealed that complete crystallization was restricted to a surface layer approximately $3 \times 10^{-2}$ inches in depth, and that although many large crystals were present in the center of the sample, total recrystallization had not occurred. In this respect then, the glasses of this invention might not be considered useful for the manufacture of homogeneous glass-ceramic articles having wall thicknesses exceeding approx. $5 - 6 \times 10^{-2}$ inches. They are, however, especially suited for the manufacture of glass fibers of the diameters cited above.

Crushed samples of the recrystallized material were examined by x-ray diffraction, and the principal crystal phase was identified as diopside. Other complex crystalline materials were present but could not be identified. No magnetite was found.

Figure 2:
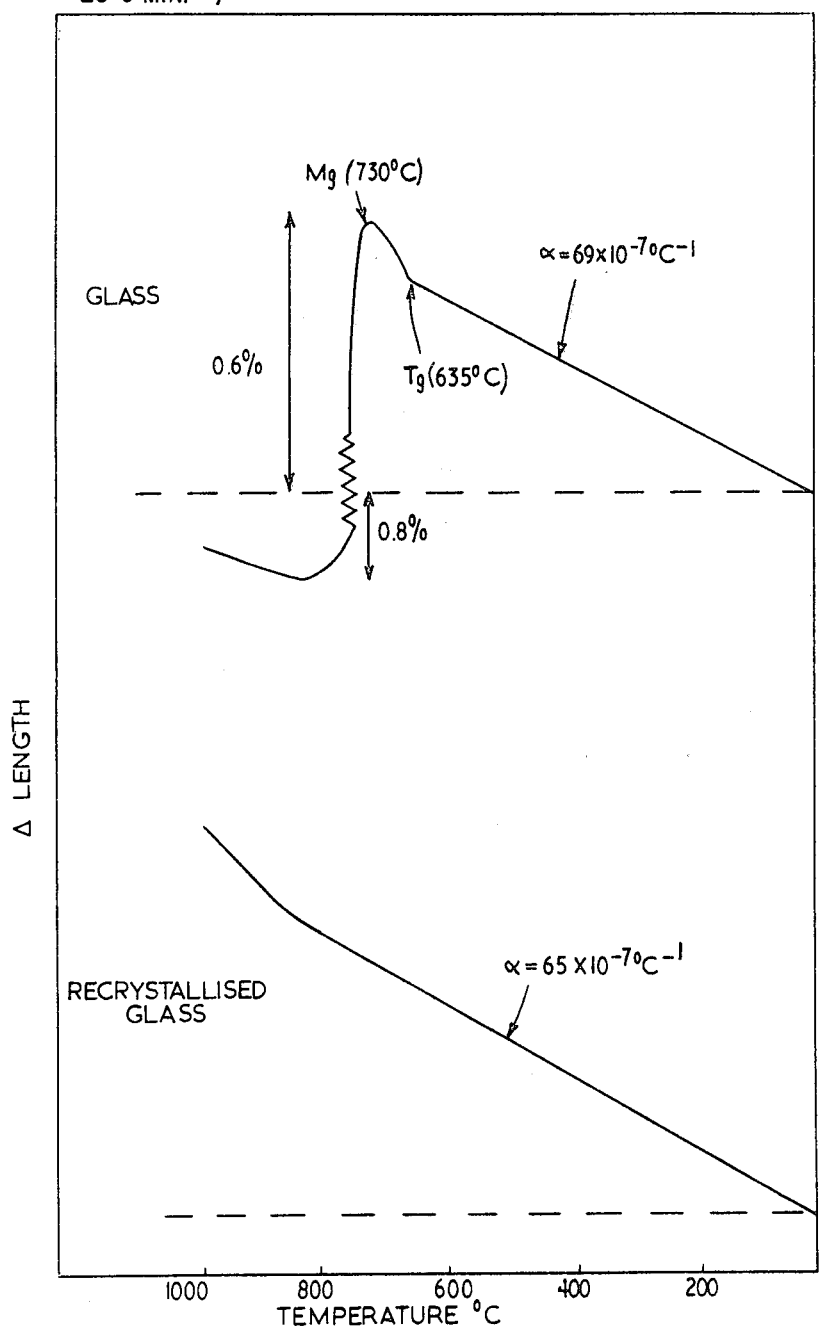

Of all glasses examined the compositions of Example 1 exhibited the most desirable combination of crystal growth with other desirable characteristics, for the purposes of the present invention. Slow recrystallization of this composition on reheating from ambient temperature commences around 700°C (1300°F), which as desired is between the glass transition temperature Tg and the dilatometric softening point Mg: bulk crystallization occurs by 820°C (1500°F) at T > Mg, with only a small deformation of the specimen. The crystalline material is then stable (with regard to deformation) at temperatures up to about 1100°C–(e.g. 1090°C). An expansion curve for the material up to 1000°C is shown in FIG. 2.

Crystallization was always observed to commence at the glass surface and pseudo-homogeneous crystallization was not observed. Reductions in the $Fe_2O_3$ and/or $TiO_2$ contents apparently produce a lower tendency to recrystallize: this is in rough agreement with theory. A relatively small decrease in the $SiO_2 + Al_2O_3$ content has been found to substantially affect the crystallization mechanism, with no bulk crystallization being observed in those areas, although some surface crystallization was found. This is unexpected and is probably associated with the precipitation of a primary spinel crystal phase; close examination of the phase diagrams yields no detailed information due to the complexity of the system.

Differential Thermal Analysis reveals an exothermic "band" (composite of several peaks) between 600° – 820°C, which is found in all the glasses examined. Such an exotherm near to Mg is usually associated with primary crystal nucleation and growth in highly crystallizeable glasses. Some of the specimens exhibit an endotherm around 900° –920°C, a phenonemom often associated with rapid changes in viscosity and stress relief at relatively high rates of temperature rise. A further exotherm is observed at T > 930°C, this being probably associated with either the precipitation of a secondary crystal phase or a phase change within the primary crystal phase. It is useful to compare the areas below the respective exotherms and endotherms (since the conditions in each experiment were identical). The two principal observations to be recorded are that the exotherm between 600° – 820°C is largest for glass of Example 1 and smallest for glass of Example 3, and that the endotherm (melting proper) around 900° – 920°C is largest for glass Example 3 and smallest for glass Example One. This confirms the general observations of recrystallization and supports the conclusion that highest degree of recrystallization is achieved in the preferred composition Example One.

For comparative purposes, the following examples are now presented. These represent three glass compositions which have been found to be unsuitable for producing crystallized glass fibers. It will be noted that the proportions of one or more of the constituents in these compositions lie outside the ranges which have been found necessary for successful results to be obtained according to this invention.

EXAMPLES 4, 5 and 6:

Three glasses were prepared from commercial glass making raw materials. The raw materials had particle sizes lying within the range U.S. Standard Screen No. 20 to U.S. Standard Screen No. 325, and were mixed for one hour in a jar mill according to the batch formulae shown in Table Four.

TABLE FOUR

| Raw Material | Example 4 | Example 5 | Example 6 |
|---|---|---|---|
| | (gms) | (gms) | (gms) |
| Silica Sand | 473 | 473 | 411 |
| Limestone | 200 | — | — |
| Dolomite | 214 | 150 | 510 |
| Soda Ash | 107 | 107 | 107 |
| Burned Magnesite | — | 141 | 19 |
| Aluminum Hydroxide | 199 | 199 | 199 |
| Rutile | 35 | 35 | 35 |
| Ferric Oxide | 80 | 80 | 80 |
| Manganese Carbonate | 5 | 5 | 5 |

The prepared glass batches were melted in fire-clay pots for 3–4 hours in an oxidizing atmosphere at temperatures in the range 2450° – 2500°F. The glass melts so formed were poured onto a cast iron slab where they rapidly solidified. The solidified melts so made had oxide formulae (by calculation) in weight percent as given in Table Five.

TABLE FIVE

| Oxide | Example 4 | Example 5 | Example 6 |
|---|---|---|---|
| $SiO_2$ | 47.3 | 47.3 | 41.1 |
| $Al_2O_3$ | 13.0 | 13.0 | 13.0 |
| CaO | 17.2 | 4.5 | 15.3 |

TABLE FIVE-continued

| Oxide | Example 4 | Example 5 | Example 6 |
|---|---|---|---|
| MgO | 4.5 | 17.2 | 12.6 |
| $Na_2O$ | 6.2 | 6.2 | 6.2 |
| $Fe_2O_3$ | 8.0 | 8.0 | 8.0 |
| $TiO_2$ | 3.5 | 3.5 | 3.5 |
| $MnO_2$ | 0.3 | 0.3 | 0.3 |

The compositions of Examples 4 and 6 yielded homogeneous black glasses, but Example 5 yielded an inhomogeneous phase which separated partially from a glassy mass.

Attempts were made to fiberize the glasses of Examples 4 and 6 using the single-hole platinum bushing employed in Examples 1, 2 and 3.

No fibers could be continuously produced.

While the present invention has been particularly described with reference to a preferred embodiment, it will be readily apparent to those skilled in the art that various changes and modifications may be made without departing from the intents and scope thereof. It is to be understood, therefore, that the scope of this invention is not to be limited to what has been specifically described herein, but to encompass all ranges and equivalents as may be included within the claims which follow.

I claim:

1. A process for preparing glass fibers which in the vitreous state have a softening point in the range of 650° to 800°C, and in the ceramic state have a softening point in the range of 1040° to 1200°C, which process comprises:
    a. compounding conventional glass making raw materials in proportions suitable for yielding glass compositions consisting essentially of:

| | |
|---|---|
| $SiO_2$ | 46.0–48.4 wt. % |
| $Al_2O_3$ | 12.5–13.6 wt. % |
| CaO | 12.0–13.8 wt. % |
| MgO | 8.9–10.6 wt. % |
| $Fe_2O_3$ | 5.0–8.0 wt. % |
| $Na_2O$ | 6.2–7.0 wt. % |
| $TiO_2$ | 2.4–3.5 wt. % |
| MnO and/or $MnO_2$ | 0.3–0.6 wt. % | b. melting said mixture of raw materials in a neutral or oxidizing environment at a temperature in the range of 1200° to 1500°C to obtain an homogeneous glass mass;
   c. forming glass from the glass mass into vitreous fibers, which fibers have a softening point in the range of 650° to 800°C, said vitreous fibers being capable, upon subsequent heating to a temperature in the range of 700° to 1035°C, of rapid nucleation and crystallization, without deformation, to a ceramic comprising spinel or diopside as the principal crystal phase.

2. A process of preparing glass fibers as in claim 1 wherein an interfelted fibrous mass is formed by the attenuation of a plurality of streams of said molten glass by the engagement of said streams in a high velocity stream of gas.

3. A process of preparing glass fibers as in claim 1 wherein the fibers are formed by supplying the heat softened glass mass to a rotating hollow spinner having a peripheral wall provided with a plurality of orifices, projecting the heat softened glass through the orifices by centrifugal force to form primary glass filaments, and rapidly attenuating said primary glass filaments by a high velocity gas blast.

4. A process of preparing glass filaments as in claim 1 wherein a continuous glass filament is produced by the mechanical drawing of that filament from a very fine orifice through which is passing molten glass at a viscosity in the range of 70 to 700 poises.

5. The process of claim 1, wherein the glass composition consists essentially of:

| | |
|---|---|
| $SiO_2$ | 47.0 wt. % |
| $Al_2O_3$ | 13.0 wt. % |
| CaO | 12.0 wt. % |
| MgO | 10.0 wt. % |
| $Na_2O$ | 6.2 wt. % |
| $Fe_2O_3$ | 8.0 wt. % |
| $TiO_2$ | 3.5 wt. % |
| $MnO_2$ | 0.3 wt. %. |

6. The process of claim 1, wherein the glass composition consists essentially of:

| | |
|---|---|
| $SiO_2$ | 48.0 wt. % |
| $Al_2O_3$ | 13.5 wt. % |
| CaO | 12.3 wt. % |
| MgO | 10.3 wt. % |
| $Na_2O$ | 6.9 wt. % |
| $Fe_2O_3$ | 5.0 wt. % |
| $TiO_2$ | 3.5 wt. % |
| $MnO_2$ | 0.5 wt. %. |

7. The process of claim 1, wherein the glass composition consists essentially of:

| | |
|---|---|
| $SiO_2$ | 47.5 wt. % |
| $Al_2O_3$ | 13.0 wt. % |
| CaO | 12.6 wt. % |
| MgO | 8.9 wt. % |
| $Na_2O$ | 6.5 wt. % |
| $Fe_2O_3$ | 7.5 wt. % |
| $TiO_2$ | 3.5 wt. % |
| $MnO_2$ | 0.5 wt. %. |

8. The process of claim 1, additionally comprising the step of collecting said fibers.

9. The process of claim 1, additionally comprising the step of heating said fibers to a temperature above the softening point of the vitreous fibers thereby rapidly devitrifying said fibers to a ceramic having spinel or diopside as the principal crystal phase.

10. Glass fibers made according to the process of claim 1.

11. Glass fibers made according to the process of claim 5.

12. Glass fibers made according to the process of claim 6.

13. Glass fibers made according to the process of claim 7.

14. Fibers made according to the process of claim 9.

* * * * *